Figure 1:
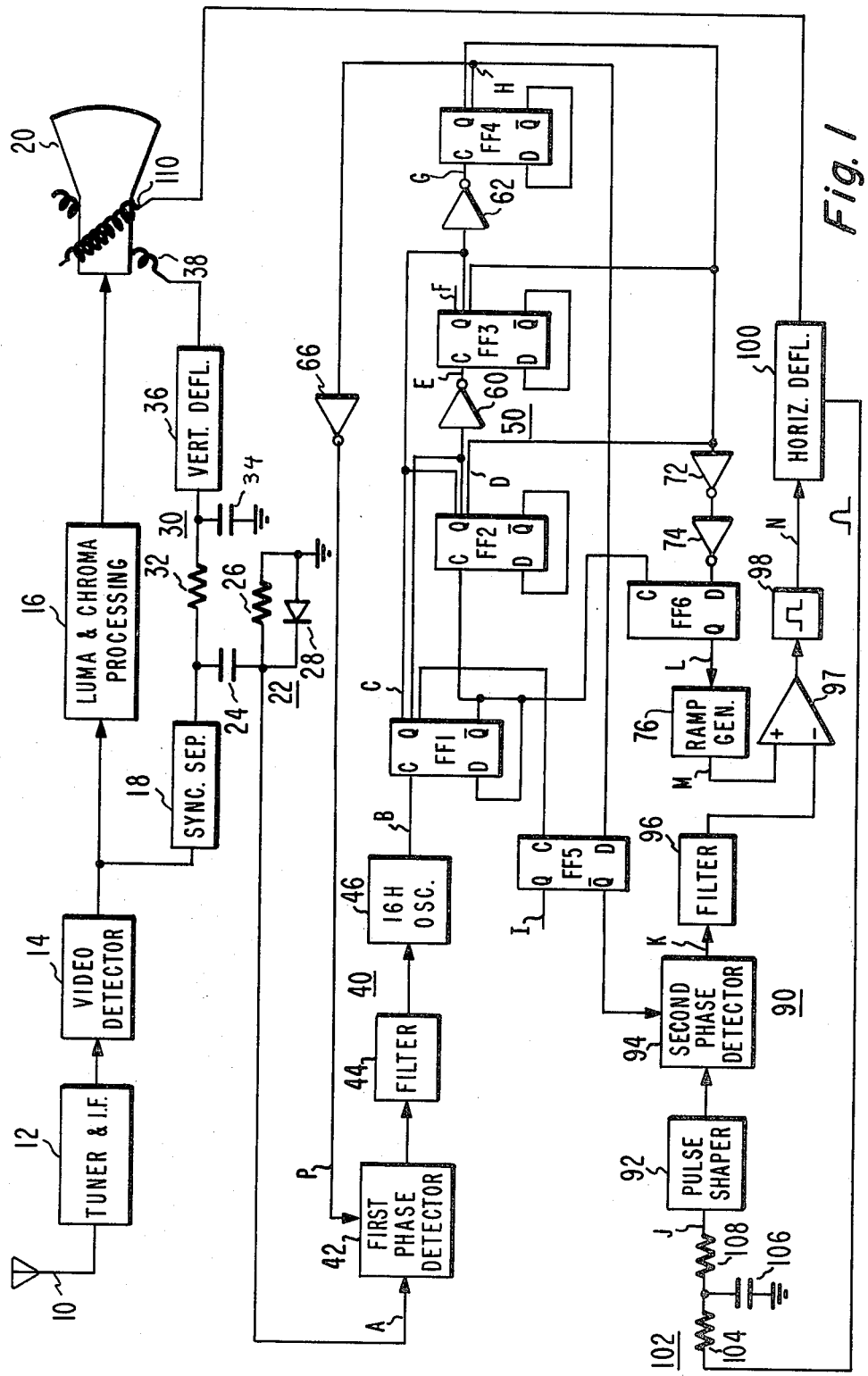

United States Patent [19]

Fernsler et al.

[11] 4,317,133
[45] Feb. 23, 1982

[54] TWO-LOOP HORIZONTAL AFPC SYSTEM

[75] Inventors: Ronald E. Fernsler; Donald H. Willis, both of Indianapolis, Ind.

[73] Assignee: RCA Corporation, New York, N.Y.

[21] Appl. No.: 192,332

[22] Filed: Sep. 29, 1980

[51] Int. Cl.³ ............................................. H04N 5/04
[52] U.S. Cl. ................................................. 358/158
[58] Field of Search ................................ 358/158, 159

[56] References Cited

U.S. PATENT DOCUMENTS 3,891,800  6/1975  Janssen et al. ..................... 358/159

OTHER PUBLICATIONS

Feindt et al., "Integrated Line Oscillator Combination TBA920", Mullard Technical Communications, No. 118, Apr. 1973, pp. 240–257.

Primary Examiner—John C. Martin
Attorney, Agent, or Firm—Paul J. Rasmussen; William H. Meagher; W. Brinton Yorks, Jr.

[57] ABSTRACT

A television horizontal AFPC system is provided including a first AFPC loop responsive to horizontal sync signals for producing a noise immune signal in phase and frequency synchronism with the horizontal sync signals. A second AFPC loop includes a phase detector responsive to a second horizontal frequency signal and flyback pulses, and produces horizontal deflection drive signals as a function of the phase relationship determined by the phase detector. A delay circuit is responsive to the noise immune horizontal frequency signal for producing the second horizontal frequency signal for the phase detector with a phase delayed with respect to the noise immune signal. A lowpass filter may be provided to delay the application of the flyback pulses to the second phase detector, its delay being chosen in accordance with the delay of the delay circuit so that a centered picture is produced on the television kinescope.

7 Claims, 2 Drawing Figures

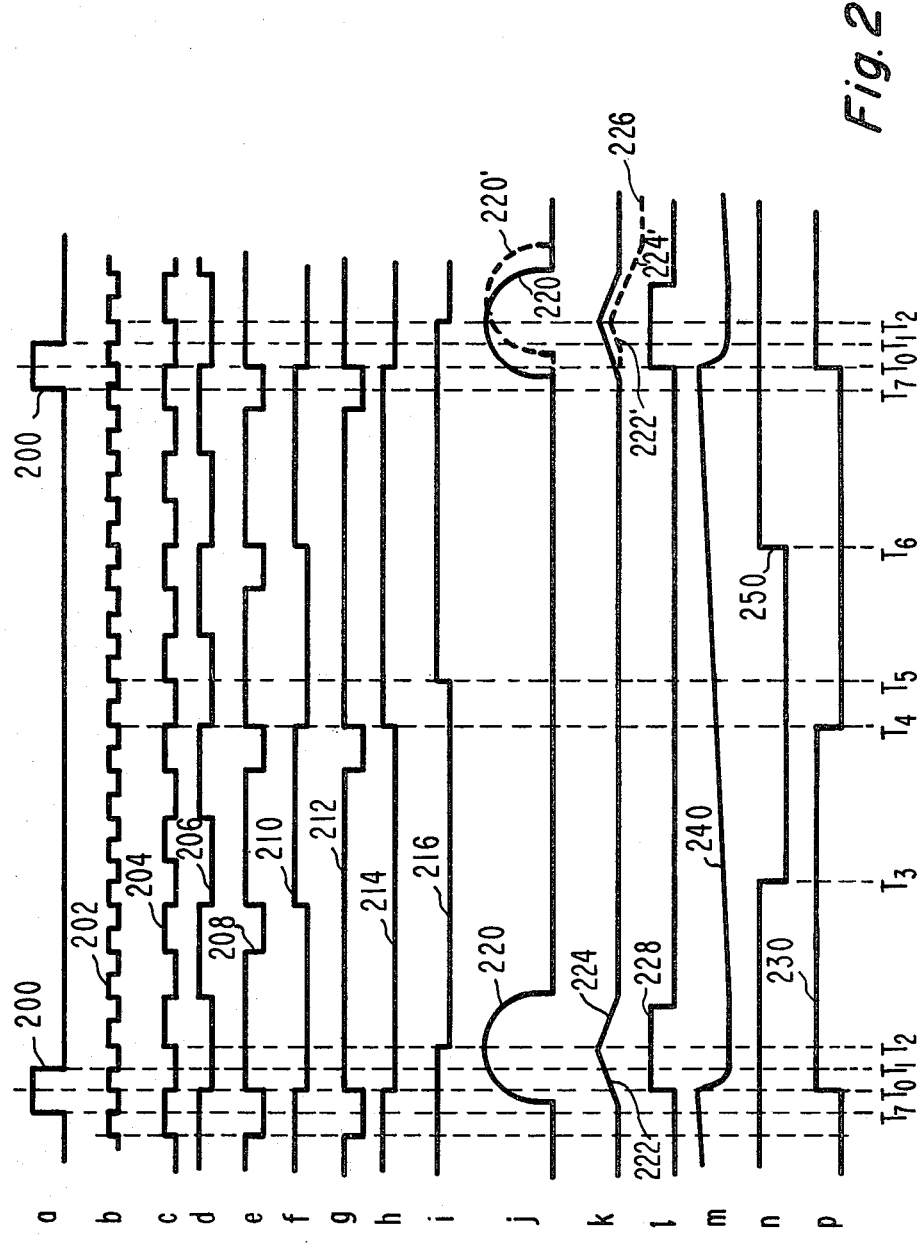

TWO-LOOP HORIZONTAL AFPC SYSTEM

This invention relates to television horizontal automatic frequency and phase control systems and, in particular, to a two-loop horizontal AFPC system with a delay between the two loops.

The purpose of a horizontal AFPC system is to produce deflection drive signals for a horizontal deflection circuit which are in phase and frequency synchronism with the horizontal sync signals. When this synchronism is achieved, the video drive signals which are supplied to the kinescope during the scanning interval should produce an image which is horizontally centered with respect to the face of the kinescope. This means that the current in the horizontal deflection windings must be reversed in preparation for a new scanning interval at the time at which the processed video information is applied to the kinescope at the beginning of a line.

Known horizontal AFPC systems, such as that shown in United States patent application Ser. No. 129,841, utilize one or more AFPC loops which tend to maintain phase synchronism between the horizontal sync signals and flyback pulses derived from the horizontal deflection circuit. If the flyback pulse becomes advanced or delayed due to such factors as power supply or beam current loading on the horizontal deflection circuit, the AFPC system will adjust the timed generation of the horizontal drive signal to pull the flyback pulse back into its desired phase synchronism with the horizontal sync signals.

In order to center the video information at the face of the kinescope, it is necessary to determine the delays encountered by signals in both the video processing circuits and the horizontal AFPC and deflection circuits. Frequently, the video processing delay will exceed the horizontal sync processing delay due to the narrow bandwidth of the chrominance signal channel. If a comb filter is used for luminance and chrominance separation in the video channel, additional delays will be introduced in the video processing system. Once these delays have been determined, it is necessary to adjust the timing of the horizontal drive signals so that each line scan is commenced at the moment that the processed video signals are applied to the kinescope.

The horizontal AFPC system will exhibit its own delay due to wave shaping of signals before phase detecting. Starting from this nominal delay, deflection timing must be further advanced or delayed to achieve the desired precise synchronism between the video display and deflection.

Deflection timing is commonly adjusted by using a differentiator or an integrator in the flyback pulse return path to the AFPC loop. The differentiator will advance the appearance of the flyback pulse at the input to the AFPC loop, which will cause the loop to respond by delaying the deflection timing. An integrator will delay the flyback pulse, thereby advancing deflection timing. Thus, in order to equalize additional delays in video processing, a differentiator is used to delay deflection timing.

A further factor to be considered is the differentiator which is commonly used to separate the horizontal sync signals from the vertical sync pulses. This differentiator will advance the timing of the horizontal sync signals, which advance must be matched by advancement of the flyback pulse through increased flyback differentiation.

Differentiation of the flyback pulses will produce three undesirable results. First, differentiating the flyback pulses will produce narrower pulses which can cause a reduction in the gain of the AFPC system, limiting the ability of the AFPC loop to track flyback phase changes to maintain a centered image. Second, the differentiator is a high pass filter network, which will tend to emphasize high frequency harmonics of the retrace frequency caused by the tuning of the high voltage transformer. The AFPC loop can respond to this high frequency information, resulting in improper phasing of the raster, particularly under heavy beam current loading. Third, heavy differentiation of the flyback pulses produces a differentiated pulse with a mid-point that will not track variations in the mid-point of the true flyback pulse under heavy loading conditions, which again causes improper phasing of the raster.

As an alternative to increased flyback differentiation, the differentiation of the horizontal sync signal could be reduced. Reduction of horizontal sync differentiation can cause a loss of horizontal phase information during the vertical sync pulse interval, resulting in tearing at the top of the picture. In addition, reduction of the differentiation of horizontal sync reduces the noise immunity of the horizontal AFPC loop, causing horizontal phase jitter.

In accordance with the principles of the present invention, picture centering is assured without the need for flyback differentiation through the use of a two-loop horizontal AFPC system with a delay between the two loops. In the first loop, the separated horizontal sync pulses are compared in phase and frequency with a reduced frequency signal divided down from a high frequency oscillator output signal. The result of the phase comparison is used to control the frequency of the oscillator. The transient response of the first loop is relatively slow in order to achieve good noise immunity for the reduced frequency signal.

The second loop compares a horizontal rate signal from the first loop with the flyback pulses and responds to phase changes in the flyback pulses by adjusting the timing of the horizontal drive signal. The second loop has a relatively fast transient response to track the phase changes of the flyback pulses.

Pursuant to the principles of the present invention, the reduced frequency signal of the first loop is delayed by a predetermined time interval with respect to the reduced frequency signal to provide the horizontal rate signal for the second loop. The predetermined delay is chosen to establish a net deflection delay which matches the delays of the video processing circuitry so as to horizontally center the video image on the kinescope. In accordance with a further aspect of the present invention, the predetermined delay may be chosen to establish a deflection delay in excess of the video processing delays, which, unless otherwise compensated for, would provide an uncentered image on the kinescope. By providing a delay in excess of that required to match the video delays, a lowpass filter may be used to couple the flyback pulses to the second loop. The lowpass filter delays the flyback pulse input to the second loop phase detector, which causes the second loop to respond by advancing the deflection timing to compensate for the excess delay between the first and second loops, resulting in a centered image. The lowpass filter also filters out undesirable high frequency information from the horizontal deflection circuit. Improper response of the second loop to high frequency harmonics is thereby prevented. In addition, the filtered flyback pulses are longer in duration, which causes the second loop to have a higher gain than would result from the use of differentiated flyback pulses, ensuring fast response by the second loop to phase changes of the flyback pulses.

In the drawings:

FIG. 1 illustrates, partially in block diagram form and partially in schematic diagram form, the video signal processing section of a television receiver constructed in accordance with the principles of the present invention; and FIG. 2 shows waveforms which explain the operation of the receiver of FIG. 1.

The television receiver of FIG. 1 includes an antenna 10 which applies radio frequency signals to the tuner and intermediate frequency circuitry 12 of the receiver. I.F. signals are applied to a video detector 14, which produces a composite video signal. The video information of the composite video signal is processed by luminance and chrominance processing circuitry 16, which applies video drive signals to a kinescope 20.

The composite video signal is also supplied to a sync separator 18, which separates the horizontal and vertical sync signals from the video information. This composite sync signal is applied to a vertical deflection circuit 36 by way of an integrator 30, including a series resistor 32 and a shunt capacitor 34. The integrator 30 supplies integrated vertical sync pulses to the vertical deflection circuit to establish the timing of vertical deflection waveforms which are applied to a vertical deflection winding 38 on the kinescope.

A differentiator 22 separates horizontal sync information from the composite sync signal and provides horizontal sync signals to the first loop 40 of a horizontal AFPC system. The differentiator 22 includes a series capacitor 24, a shunt resistor 26, and a clipping diode 28 coupled in parallel with the resistor 26. The horizontal sync signals are applied to one input of a first phase detector 42. The first phase detector 42 also receives an output signal from a counter 50 at a second input. The output signal resulting from a phase comparison of these two signals is filtered by a filter 44 and applied as a control signal for a 16H oscillator 46, having a nominal frequency which is sixteen times the desired horizontal scanning frequency. The oscillator 46 produces an output signal which is applied to the counter 50.

The counter 50 divides the oscillator output signal by sixteen to produce a signal at the fundamental horizontal frequency for the first phase detector. The counter 50 comprises four cascaded "data" type flip-flops FF1 through FF4. Each flip-flop has its $\overline{Q}$ output connected to its D input to divide the clock signal applied to its C input by two. Each flip-flop also has a number of $\overline{Q}$ outputs which are internally buffered from each other so that the grounding of one Q output will not affect the output levels of the other Q outputs of the flip-flop.

FF1 flip-flop receives the oscillator output signal at its C input and has its three Q outputs connected to the input of an inverter 60, the input of an inverter 62, and the C input of a further flip-flop FF5, respectively. The $\overline{Q}$ output of FF1 is coupled to the C input of FF2 and the C input of a flip-flop FF6. Flip-flop FF2 has three Q outputs coupled to the input of inverter 60, the input of inverter 62, and the input of an inverter 72, respectively. The output of inverter 60 is coupled to the C input of FF3, which has two Q outputs coupled to the input of inverter 62, and the input of inverter 72, respectively.

The output of inverter 62 is coupled to the C input of FF4. Flip-flop FF4 has a first Q output coupled to the input of an inverter 66 and the D input of FF5, and a second Q output coupled to the input of inverter 72. The output of inverter 66 supplies a horizontal rate signal to the first phase detector 42.

The output of inverter 72 is coupled to the D input of FF6 by another inverter 74. The Q output of FF6 is coupled to the input of a ramp generator 76, the output of which is coupled to the input of a comparison circuit 97. The $\overline{Q}$ output of FF5 is coupled to one input of a second phase detector 94 of a second AFPC loop 90.

The output of the second phase detector 94 is filtered by a filter 96 and the filtered output signal is applied to a second input of comparison circuit 97. The output of the comparison circuit 97 is coupled to a pulse generator 98, the output of which supplies a horizontal deflection drive signal to a horizontal deflection circuit 100. The horizontal deflection circuit 100 supplies horizontal deflection waveforms to a horizontal deflection winding 110 on the kinescope, and develops flyback pulses for the second phase detector 94. The flyback pulses are filtered by a lowpass filter 102, including a first series resistor 104, a shunt capacitor 106, and a second series resistor 108. The resistor 108 is coupled to the input of a pulse shaper 92, which squares up the filtered flyback pulses and applies them to the second input of the second phase detector 94.

The operation of the arrangement of FIG. 1 may be understood by referring to the waveforms of FIG. 2 together with FIG. 1. The waveforms of FIG. 2 are designated by lower-case letters indicating signal waveforms at points in FIG. 1 identified by corresponding upper-case letters.

FIG. 2a illustrates horizontal sync pulses 200 which are applied to the input of the first phase detector 42 by differentiator 22 at point A. Each sync pulse 200 begins at time reference $T_7$ and ends at time reference $T_1$. The time reference markers at the bottom of FIG. 2 are all referenced to time $T_0$, recurring at the center of each horizontal sync pulse. In the embodiment of FIG. 1, standard horizontal sync pulses having a duration of 5.1 microseconds are narrowed to a pulse width of 3.8 to 4.0 microseconds by the differentiator 22, as shown in FIG. 2a.

When the first AFPC loop 40 is synchronized, the 16H oscillator 45 produces an output waveform 202 of approximately 251 kHz, shown in FIG. 2b. The pulse train of FIG. 2b is divided in half by FF1 to produce waveform 204 of FIG. 2c. It may be seen that all of the flip-flops of this embodiment change state on the positive clock edge; however, negative edge-triggered flip-flops may also be used.

Flip-flop FF2 receives the inverse of waveform 204 from the $\overline{Q}$ output of FF1 and produces a waveform 206, shown in FIG. 2d. Waveform 206 in ANDed with waveform 204 at the input of inverter 60 to produce a low output signal whenever both input signals are in their high states, as shown by waveform 208 in FIG. 2e. By reason of the ANDing with waveform 204, flip-flop FF3 will be switched synchronously with the output signal of FF1.

Flip-flop FF3 switches on the rising edges of waveform 208 to produce an output waveform 210 as shown in FIG. 2f. This waveform is ANDed with waveforms 204 and 206 at the input of inverter 62 to produce the waveform 212 at the output of the inverter, which is synchronous with waveform 204 on its positive-going transitions, as shown in FIG. 2g. Flip-flop FF4 changes state on the positive-going edges of waveform 212, producing a horizontal-rate output waveform 214 as shown in FIG. 2h.

Waveform 214 is inverted by inverter 66 to produce a horizontal-rate waveform 230, shown in FIG. 2p. This waveform 230 is applied to the first phase detector 42. The first loop 40 will act to locate the positive-going transitions of waveform 230 at time references $T_0$, the center points of sync pulses 200.

In prior art arrangement such as that described in the aforementioned U.S. patent application Ser. No. 129,841, the horizontal rate waveform 214 is applied to the phase detector of the second AFPC loop. The second loop will then tend to align the center of the flyback pulse with the transitions of waveform 214 occurring at time $T_0$. In accordance with the principles of the present invention, waveform 214 is applied to the D input of flip-flop FF5, which receives waveform 204 as a clock signal. At times $T_2$ and $T_5$, the waveform 204 causes flip-flop FF5 to change state, thereby following the transitions of waveform 214 which occur at times $T_0$ and $T_4$. Flip-flop FF5 produces an output waveform 216 shown in FIG. 2i, which is delayed with respect to waveform 214 by half the period of waveform 204. The inverse of delayed waveform 216 is then applied to the second phase detector 94 from the $\overline{Q}$ output of flip-flop FF5 as the time reference signal for the second loop.

The second phase detector 94 compares waveform 216 with flyback pulses 220 of FIG. 2j and produces an upward ramping output signal 222 before the waveform 216 transition at time $T_2$, and a downward ramping output signal 224 after the $T_2$ transition, as shown in FIG. 2k. The ramping signals are filtered by filter 96 and applied to one input of comparison circuit 97. When the two ramping signals are equal in duration, the filtered signal experiences no net change, and the transition of waveform 216 is centered with respect to flyback pulse 220. If the phase of the flyback pulse changes, as shown by the broken line pulse 220' in FIG. 2j, the phase detector 94 will produce unequal ramps 222' and 224' with a net change in the filtered signal to a new level 226. The effect of this new level will be discussed below.

Flip-flop FF6 receives a signal at its D input which is the ANDed sum of waveforms 206, 210 and 214. Flip-flop FF6 is clocked by the inverse of waveform 204, producing an output pulse 228 as shown in FIG. 2l. This pulse resets ramp generator 76, as shown in FIG. 2m. The ramp waveform 240 thereshown resumes after the termination of pulse 228. When the ramp 240 reaches the level of the filtered output signal at some later time $T_6$, the comparator 97 triggers pulse generator 98 to produce a horizontal drive signal 250, as shown in FIG. 2n. The pulse generator 98 produces a pulse of a predetermined duration which ends at time $T_3$.

When the flyback pulse is delayed as illustrated by pulse 220', the level of the filtered output signal will decrease to a level 226 as shown in FIG. 2k. This lower level 226 will intersect the ramp 240 at an earlier time than time $T_6$, causing the production of the succeeding horizontal drive signal 250 at an earlier time. The following deflection signal and resulting flyback pulse will advance in time with respect to the previous flyback pulse 220', and succeeding flyback pulses will in this manner be brought back into a centered relationship with respect to the transition of delayed waveform 216 at time $T_2$.

In the embodiment of FIG. 1, waveform 216 is delayed with respect to waveform 214 by an amount which will establish a total horizontal deflection delay which is in excess of the total video delay. The selection of this excessive delay assures the designer that an equalizing delay, rather than an advance in time, is required in the flyback pulse path. The guarantee of a need for additional equalizing delay precludes the need for a differentiator to advance the flyback timing, which would couple high frequency signals into the second loop. A lowpass filter is then chosen to provide an equalizing delay in the flyback pulse return path which neutralizes the excess delay of waveform 216. The total horizontal deflection delay will then match the total video processing delay to center the image on the kinescope, and the lowpass filter will attenuate the high frequency signals in the flyback pulse return path.

What is claimed is:

1. In a television receiver, including a source of composite video signals; means responsive to said composite video signals for separating horizontal synchronizing signals from said composite video signals; and a horizontal deflection circuit for producing horizontal flyback pulses and horizontal deflection waveforms for displaying an image on a kinescope; a horizontal automatic frequency and phase control system comprising:

a first automatic frequency and phase control loop coupled to receive said horizontal synchronizing signals for producing a first substantially horizontal rate signal which is in substantial phase and frequency synchronism with said horizontal synchronizing signals;

a second automatic frequency and phase control loop, coupled to said horizontal deflection circuit, and including a phase detector responsive to a second substantially horizontal rate signal and said flyback pulses for producing timed deflection drive signals for said horizontal deflection circuit so as to maintain said flyback pulses in substantial phase and frequency synchronism with said second substantially horizontal rate signal;

means coupled between said first and second automatic frequency and phase control loops, and responsive to said first substantially horizontal rate signal for producing said second substantially horizontal rate signal which is delayed in time with respect to said first substantially horizontal rate signal by an amount in excess of the delay required to center the image on said kinescope upon application of undelayed flyback pulses to said phase detector; and a lowpass filter coupled between said horizontal deflection circuit and said phase detector for delaying said flyback pulses prior to application to said phase detector, said delay of said flyback pulses causing an advance of the timing of said deflection drive signals which compensates for the excess delay of said delaying means so as to center the image on said kinescope.

2. In a television receiver, including a source of composite video signals; means responsive to said composite video signals for separating horizontal synchronizing signals from said composite video signals; and a horizontal deflection circuit for producing horizontal flyback pulses and horizontal deflection waveforms for displaying an image on a kinescope; a horizontal automatic frequency and phase control system comprising:

a first automatic frequency and phase control loop including a first phase detector having a first input coupled to receive said horizontal synchronizing signals and a second input, and means coupled to said first phase detector for producing a substantially horizontal rate signal which is in substantial phase and frequency synchronism with said horizontal synchronizing signals, said horizontal rate signal being applied to said second input of said first phase detector;

means having an input coupled to receive said substantially horizontal rate signal and an output for producing a delayed replica of said substantially horizontal rate signal; and a second automatic frequency and phase control loop coupled to said horizontal deflection circuit and including a second phase detector having a first input coupled to receive said delayed replica of said substantially horizontal rate signal and a second input coupled to receive said flyback pulses for producing timed deflection drive signals for said horizontal deflection circuit which center said image on said kinescope.

3. A television receiver including a source of composite video signals; a kinescope; video information processing circuitry responsive to said composite video signals for providing video information signals for said kinescope, said processing circuitry imparting a given delay to said video information during processing; means for separating horizontal synchronzing signals from said composite video signals; a horizontal deflection circuit responsive to horizontal drive signals for developing horizontal deflection waveforms for said kinescope and flyback pulses; and a horizontal automatic frequency and phase control system comprising:

a first automatic frequency and phase control loop coupled to receive said horizontal synchronizing signals for producing a substantially horizontal rate signal which is in substantial phase and frequency synchronism with said horizontal synchronizing signals;

a second automatic frequency and phase control loop, coupled to said horizontal deflection circuit and including a phase detector responsive to said substantially horizontal rate signal and said flyback pulses for producing horizontal drive signals for said horizontal deflection circuit so as to maintain said flyback pulses in substantial phase and frequency synchronism with said second substantially horizontal rate signal;

first delaying means coupled between said first and second loops for delaying said substantially horizontal rate signal prior to application to said phase detector; and second delaying means for delaying the application of said flyback pulses to said phase detector, the delays of said first and second delaying means being chosen so as to bring said deflection timing into a proper timing relationship with said video information signals.

4. In a television receiver, including a source of composite video signals, means for separating horizontal sync signals from said composite video signals, and a horizontal deflection circuit which provides horizontal deflection waveforms for a kinescope and flyback pulses; a horizontal automatic frequency and phase control system comprising:

a first AFPC loop including (a) a first phase detector coupled to receive said horizontal sync signals and responsive to a first substantially horizontal rate signal for developing a first control signal;

(b) a controlled oscillator coupled to receive said first control signal for producing an oscillatory signal having a frequency which is substantially equal to a multiple of the frequency of said horizontal sync signals;

(c) a counter coupled to receive said oscillatory signal for producing said first substantially horizontal rate signal and a clock signal having a frequency which is an integral multiple of the frequency of said first substantially horizontal rate signal; and (d) means for applying said first substantially horizontal rate signal to said first phase detector;

a second AFPC loop including (e) a second phase detector coupled to receive a second substantially horizontal rate signal and said flyback pulses and having an output for producing a second control signal indicative of the phase relationship between said second substantially horizontal rate signal and said flyback pulses; and (f) means, having an input coupled to said output of said second phase detector and an output coupled to said horizontal deflection circuit for controlling the timed occurrence of said horizontal deflection waveform and said flyback pulses as a function of said second control signal; and means, having first and second inputs coupled to said counter and an output coupled to said second phase detector, and responsive to said first substantially horizontal rate signal and said clock signal for producing said second substantially horizontal rate signal with a phase delayed in time with respect to the phase of said first substantially horizontal rate signal.

5. The arrangement of claim 4, wherein:

said second substantially horizontal rate signal producing means comprises a flip-flop which is clocked by said clock signal so that said second substantially horizontal rate signal is delayed in time with respect to said first substantially horizontal rate signal by a time increment equal to a portion of the period of said clock signal.

6. The arrangement of claim 5, wherein said first AFPC loop tends to align transitions of said first substantially horizontal rate signal of a given polarity with the centers of the horizontal sync pulses of said horizontal sync signal, and wherein said second AFPC loop tends to align the centers of said flyback pulses at the input of said second phase detector with transitions of said second substantially horizontal rate signal of a given polarity.

7. The arrangement of claim 6, wherein said second AFPC loop further includes a lowpass filter for coupling said flyback pulses between said horizontal deflector circuit and said second phase detector.

* * * * *